United States Patent [19]

Levresse et al.

[11] Patent Number: 4,650,841

[45] Date of Patent: Mar. 17, 1987

[54] CONTINUOUS PROCESS FOR THE MANUFACTURE OF ETHYLENE HOMOPOLYMERS OR ETHYLENE COPOLYMERS

[75] Inventors: Bernard Levresse, St. Arnould par Caudebec en Caux; Edmond Hilt, Lievin; Karel Bujadoux, Lens, all of France

[73] Assignee: Societe Chimique Des Chabonnages, Paris, France

[21] Appl. No.: 565,178

[22] Filed: Dec. 23, 1983

[30] Foreign Application Priority Data

Dec. 24, 1982 [FR] France ............................... 82 21735

[51] Int. Cl.[4] .............................................. C08F 6/02
[52] U.S. Cl. ....................................... 526/68; 526/83; 526/84
[58] Field of Search ............................... 526/68, 83, 84

[56] References Cited

U.S. PATENT DOCUMENTS

| | | | |
|---|---|---|---|
| 3,242,149 | 3/1966 | Giachetti et al. | 526/82 X |
| 3,708,465 | 1/1973 | Dietrich et al. | 526/84 |
| 4,105,609 | 8/1978 | Machon et al. | 526/84 X |
| 4,168,356 | 9/1979 | Levresse et al. | |
| 4,331,791 | 5/1982 | Rohlfing et al. | 526/68 X |
| 4,342,853 | 8/1982 | Durano et al. | 526/68 |
| 4,412,025 | 10/1983 | Corwin et al. | 524/243 X |
| 4,419,473 | 12/1983 | Mahaffey, Jr. | 524/104 |
| 4,551,509 | 11/1985 | Takayuki | 526/84 |

FOREIGN PATENT DOCUMENTS

| | | |
|---|---|---|
| 0001150 | 3/1979 | European Pat. Off. . |
| 2841646 | 4/1980 | Fed. Rep. of Germany . |
| 884116 | 12/1961 | United Kingdom . |
| 967619 | 8/1964 | United Kingdom . |
| 467909 | 5/1975 | U.S.S.R. . |

*Primary Examiner*—Paul R. Michl
*Attorney, Agent, or Firm*—Finnegan, Henderson, Farabow, Garrett & Dunner

[57] ABSTRACT

The process, which comprises a first stage for (co)-polymerizing ethylene at 180°–320° C. and 300–2,500 bars in the presence of a Ziegler type catalytic system, a second stage for separation, a third stage for recycling unreacted monomers, and a fourth, recompression stage, is characterized by introducing into the stream of recycled monomer(s) during the third stage, at least one compound selected from the amides of the saturated or unsaturated organic acids containing from 12 to 22 carbon atoms, polyalkylene polyols containing from 4 to 500 carbon atoms, and compounds containing at least two epoxide functions, with a molecular weight greater than approximately 200. Preferably from 0.005 to 0.1 mole of the selected compound is introduced per ton of recycled monomer.

This process makes it possible to avoid the formation of high molecular weight polymers in the recycle circuits.

14 Claims, 1 Drawing Figure

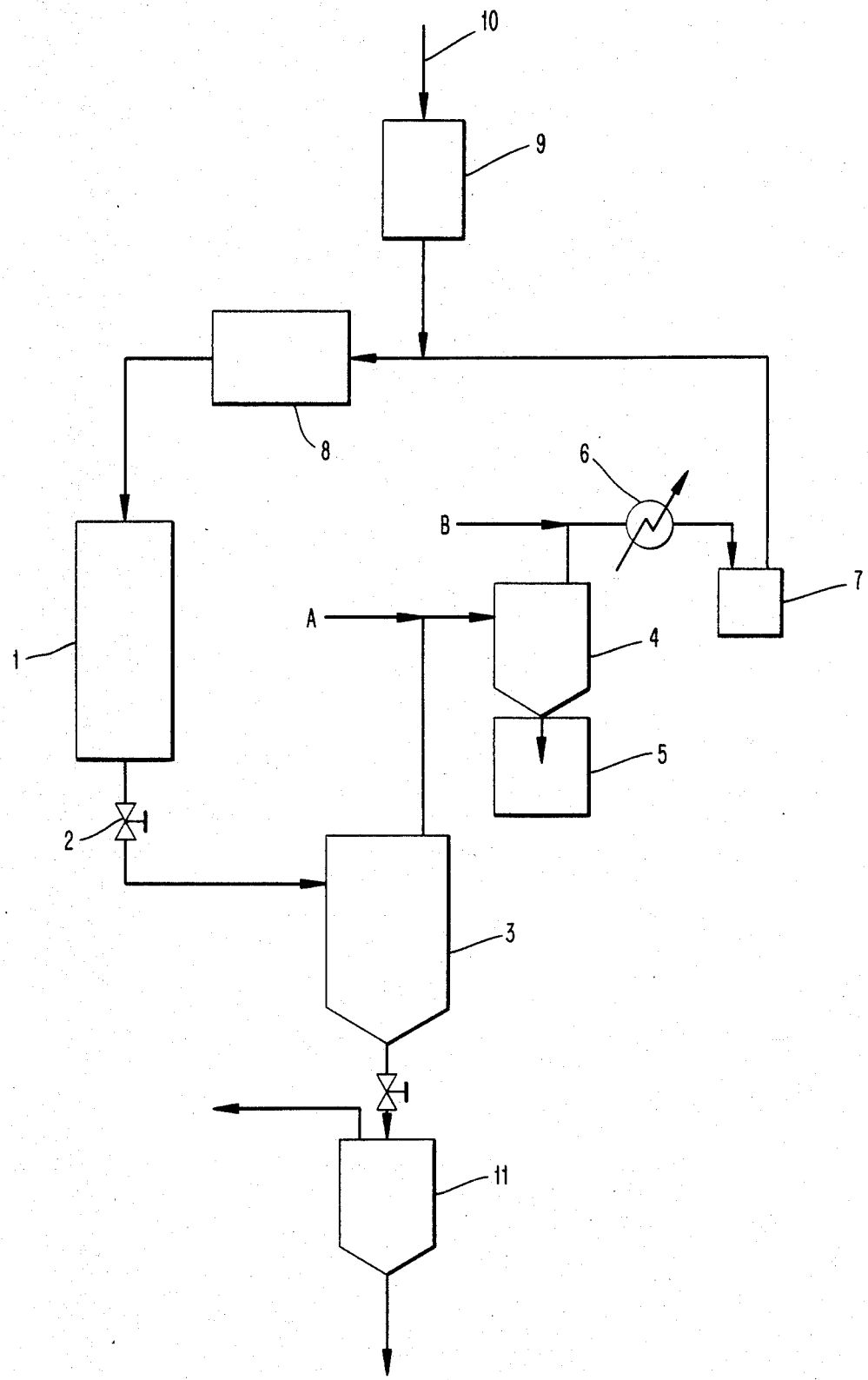

CONTINUOUS PROCESS FOR THE MANUFACTURE OF ETHYLENE HOMOPOLYMERS OR ETHYLENE COPOLYMERS

BACKGROUND OF THE INVENTION

The present invention relates to a continuous process for the manufacture of homopolymers or copolymers of ethylene.

It is known from French Pat. No. 2,202,899 to homopolymerize ethylene and to copolymerize ethylene with at least one α-olefin, continuously, in the presence of a Ziegler type catalytic system at high temperature and under high pressure.

The plant employed comprises at least one reactor comprising at least one reaction zone, at least one separator, and circuits for recycling the unreacted ethylene and, where applicable, the unreacted α-olefins (hereafter called "the monomers") towards a secondary compressor, which also receives fresh monomers from a primary compressor and which feeds the reactor at the chosen (co)polymerization pressure.

In a process of this type traces of the components of the catalytic system can be carried over with the gases circulating in the recycle circuits, causing a (co)polymerization of the recycled monomers in the circuits. (Co)polymers generally of very low molecular weight (below 2,000) are thus formed, having, under the normal conditions of temperature and pressure, the appearance of oils, greases, or waxes. Traps are generally provided in the recycle circuits to collect these (co)polymers of very low molecular weight. However, these (co)polymers can also be deposited on the inner wall of the recycle lines and their molecular weight can increase as a consequence of the continuous flow of the recycle gases containing traces of components of the catalytic system. While the polymers of very low molecular weight cause little inconvenience, being easy to remove, the (co)polymers of higher molecular weight (greater than 2,000) are a major nuisance and can cause a pressure drop in the plant, and even result in the blocking of the recycle lines.

SUMMARY OF THE INVENTION

An object of the present invention is to overcome these disadvantages by proposing a process that causes an interruption in the growth of the polymers formed in the recycle circuits, allowing only polymers of very low molecular weight (for example between 500 and 2,000) to remain, when applicable, thereby avoiding the pressure drops between the separator and the secondary compressor and, where appropriate, the blocking of the recycle lines.

Additional objects and advantages of the invention will be set forth in the description that follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the subject of the invention comprises a continuous process for the manufacture of homopolymers of ethylene or of copolymers of ethylene with at least one α-olefin containing from 3 to 8 carbon atoms comprising in succession:

(a) a first stage for (co)polymerizing ethylene at a temperature of between 180° and 320° C., at a pressure of between 300 and 2,500 bars, in the presence of a catalytic system comprising, on the one hand, at least one halogenated compound of a transition metal from groups IVa to VIa of the Periodic System and, on the other hand, at least one activator selected from the hydrides and the organometallic compounds of metals of groups I to III of the Periodic System, the molar ratio of the activator to the transition metal compound being between 1 and 10;

(b) a second stage for separating the (co)polymer formed from unreacted monomer(s), at a pressure of between 100 and 500 bars;

(c) a third stage for recycling the unreacted monomer(s); and (d) a fourth stage for recompression up to the (co)polymerization pressure, wherein the third stage comprises introducing into the stream of recycled monomer(s), during the third stage, at least one compound selected from the amides of saturated or unsaturated organic acids containing from 12 to 22 carbon atoms, polyalkylene polyols containing from 4 to 500 carbon atoms, and compounds containing at least 2 epoxide functions, with a molecular weight greater than approximately 200.

The accompanying drawing, which is incorporated in and constitutes a part of this specification, illustrates the process of the invention and, together with the description, serves to explain the principles of the invention.

BRIEF DESCRIPTION OF THE DRAWINGS

The FIGURE is a flow diagram of an embodiment for carrying out a process in accordance with the present invention.

DESCRIPTION OF THE PREFERRED EMBODIMENTS

Reference will now be made in detail to the presently preferred embodiments of the invention, an example of which is illustrated in the accompanying drawing.

The α-olefin containing from 3 to 8 carbon atoms is chosen from propylene, but-1-ene, pent-1-ene, hex-1-ene, the methyl-pent-1-enes, hept-1-ene, oct-1-ene, and their mixtures.

Use is made advantageously of propylene, but-1-ene, hex-1-ene, or mixtures of propylene with but-1-ene, or of but-1-ene with hex-1-ene.

The first stage for (co)polymerizing ethylene is carried out in at least one reactor comprising at least one reaction zone. One or more autoclave and/or tubular reactors may be employed. In order to control accurately the melt index of the (co)polymer which is formed, it may be advantageous to carry out the (co)polymerization in the presence of up to 2 mole % of a chain transfer agent, such as hydrogen.

The catalytic system used comprises, on the one hand, at least one halogenated compound of a transition metal from groups IVa to VIa of the Periodic System, which may be:

violet titanium chloride $TiCl_3.\frac{1}{3}AlCl_3$, a compound of the formula $(TiCl_a)(MgCl_2)y\,(AlCl_3)_z$ $(RMgCl)_b$ in which $2 \leq a \leq 3$, $y \geq 2$, $0 \leq z \leq \frac{1}{3}$, and $0 \leq b \leq 1$, alone or mixed with a compound of the formula $TiCl_3\,(AlCl_3)_w\,(E.TiCl_4)_x$ in which $0 \leq w \leq \frac{1}{3}$, $0 \leq x \leq 0.03$, and E is a diisoamyl ether or di-n-butyl ether, the product obtained by contacting a magnesium complex compound containing at least one compound chosen from magnesium monohalides and halomagnesium hydrides with a halide of titanium or of vanadium in which the metal has a valency not greater than 3, a compound of the formula $(MX_a)(MgX_2)_b(RMgX)_c(HMgX)_d$, in which M is a metal from group IVa or Va of the Periodic System, X is a halogen, R is a hydrocarbon radical, and $2 \leq a \leq 3.5$, $1 \leq b \leq 30$, $1 < c \leq 8$, and $0 \leq d \leq 10$, a compound of the formula $(TiCl_3 \cdot \frac{1}{3} AlCl_3)(MCl_3)_x (MgX_2)_y$ in which M is a transition metal from groups Va and VIa of the Periodic System, X is a halogen, $0.3 \leq x \leq 3$, and $0 \leq y \leq 20$, a compound formed from mixed crystals containing $TiCl_3$ (or $TiCl_2$), $AlCl_3$, and other metal chlorides such as $FeCl_2$, $NiCl_2$, $MoCl_3$, $MgCl_2$, a compound of the formula $(MX_3)(\phi n\ SiL_{4-n})_b$ in which M is a transition metal from groups IVa to VIa of the Periodic System, $\phi$ is an aromatic or polyaromatic ring, optionally substituted, having from 6 to 15 carbon atoms, L is either a halogen atom or a hydroxy group, and $1 \leq n \leq 3$, $0.2 \leq b \leq 2$, the compound being, if appropriate, combined with $AlCl_3$, $MgCl_2$ and/or a halide of a metal from group VIII, compound of the formula $X_{m-n} M(OR)_n$ in which M denotes one or more metals from groups Ia, IIa, IIb, IIIb, and VIIa of the Periodic System, X is a monovalent inorganic radical, R is a monovalent hydrocarbon radical, m is the valency of M, and $1 \leq n \leq m$, placed in the presence of a halogen derivative of a transition metal from groups IVa to VIa.

The catalytic system comprises further at least one activator which is chosen from the hydrides and the organometallic compounds of metals of groups I to III of the Periodic System, and which can be:

an alkyl aluminum, such as triethylaluminum, tributylaluminum, triisobutylaluminum, trioctylaluminum, a chlorodialkylaluminum such as chlorodiethylaluminum, a dichloroalkylaluminum such as dichloroethylaluminum, an alkylsiloxalane of the formula

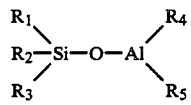

$R_1$, $R_2$, $R_3$, and $R_4$ being hydrocarbon radicals containing from 1 to 10 carbon atoms and $R_5$ being either a hydrocarbon radical containing from 1 to 10 carbon atoms or a radical of the type

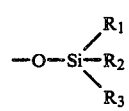

a compound based on an alkylaluminum fluoride and having the formulae $(AlR_2F)(AlR_2X)_a$ or $(AlR_2F)(AlR_2H)_b(AlR_3)_c$, in which R is an alkyl group containing from 1 to 12 carbon atoms, X is a halogen other than fluorine, $0.1 \leq a \leq 0.4$, $0.1 \leq b \leq 0.4$, and $0.05 \leq c \leq 0.2$.

The catalytic system may be deposited on an inert carrier comprising, for example, one or more of the following compounds: $MgCl_2$, $Al_2O_3$, $MoO_3$, $MnCl_2$, $SiO_2$, $MgO$.

The amides of saturated organic acids which can be used according to the invention are, for example, lauramide, myristamide, palmitamide, stearamide, arachidamide. The amides of unsaturated organic acids which can be used according to the invention are, for example, oleamide, elaidamide, erucamide, brassidamide. The polyalkylene polyols which can be used according to the invention are, for example, polyethylene glycols with a molecular weight between 200 and 10,000, polypropylene glycols with a molecular weight between 250 and 4,000, co-telomeric poly(ethylene-propylene) glycols, and their mixtures.

The compounds containing at least two epoxide functions which can be used according to the invention are, in particular, epoxydized soya bean oil, epoxy derivatives of esters of polyunsaturated organic acids, epoxy derivatives of compounds with several aromatic rings, such as the diglycidyl ether of bisphenol A.

The quantity of compound used according to the invention is preferably between 0.005 and 0.1 mole per ton of recycled monomers. This quantity can be distributed at various points in the recycle circuit. If the plant shown diagrammatically in the drawing is considered, in which (1) is the polymerization reactor, (2) the reactor discharge valve, (3) the intermediate pressure separator, (11) a low-pressure separation hopper, (4) a standard cyclone mounted on a catchpot (5), (6) a cooler, (7) a second catchpot, (8) the secondary compressor, (9) the primary compressor, and (10) the feed line for fresh monomer(s), the points of introduction of the compound or compounds can be situated, for example, at (A) and/or (B).

The compound can be introduced either in the pure form, or in a diluted form, in solution or in suspension in an inert solvent, for example a saturated hydrocarbon. It can be introduced, for example, continuously with the aid of any suitable means such as a high pressure pump.

The process according to the invention makes it possible, on the one hand, to interrupt the growth and/or to increase the fluidity of the polymers produced in the monomer recycle stage and, on the other hand, to reduce the degree of isomerization of but-1-ene (a comonomer introduced into the reactor and/or formed by the dimerization of ethylene) to but-2-ene (an undesirable compound that does not copolymerize and therefore accumulates in the gas recycle circuits). The process according to the invention is therefore of great interest both from a technical and from an economic point of view.

The non-limiting examples that follow are provided to illustrate the invention.

EXAMPLES 1 TO 4

The plant employed is shown diagrammatically in the drawing. It comprises a three-zone autoclave reactor (1) whose operating temperatures are respectively 210°, 260°, and 280° C. A mixture of 60% by weight of ethylene and 40% by weight of but-1-ene is copolymerized in this reactor, at a pressure of 800 bars, in the presence of the catalyst system (TiCl$_3$.⅓ AlCl$_3$.VCl$_3$)/3(C$_2$H$_5$)$_3$ Al introduced into the first two reaction zones and in the presence of 0.1 mole % of hydrogen, so as to produce a copolymer with a melt index (measured according to the ASTM Standard D 1238-73) of between 1 and 1.5 dg/min. The mean residence time of the catalytic system in the reactor is 40 seconds. The separator usually operates at a pressure of 250 bars.

With the exception of the comparative example 1, 0.027 mole, per ton of recycled monomer mixture, of the compound shown in Table I, is introduced at each of the injection points (A) and (B), that is to say a total of 0.054 mole of compound per ton of recycled monomers.

Stearamide (Example 2) is introduced as a suspension in paraffin oil at a concentration of 50 g/liter.

Epoxydized soya bean oil (Example 3) is a commercial product, STAINOR ® HS 39, introduced in the pure form.

Polyethylene glycol (Example 4) is a commercial product, EMKAPOL ® 6000, (molecular weight 6,000) introduced in the form of an emulsion in a C$_{12}$-C$_{14}$ hydrocarbon fraction.

Table I shows, furthermore, the melt index (MI) of the greases collected in the cyclone (4) and in the catch-pot (7), the concentration of but-2-ene (CB2) in percent by weight in the recycled gases (concentration measured at the outlet of the catchpot (7)), and the pressure drop PD (expressed in bars) between the separator (4) and the secondary compressor (8) suction at the end of 0, 50, 100, and 200 hours' continuous operation.

TABLE

| Example | Compound | MI (4) | MI (7) | CB2 | PD 0 h | PD 50 h | PD 100 h | PD 200 h |
|---|---|---|---|---|---|---|---|---|
| 1 | — | 5 | 2 | 6 | 35 | 100 | 150 | 200 |
| 2 | stearamide | 50 | 25 | 4 | 40 | 40 | 45 | 50 |
| 3 | epoxydized soya bean oil | 15 | 8 | 3 | 35 | 40 | 50 | 60 |
| 4 | polyethylene glycol 6000 | 20 | 8 | 3 | 35 | 40 | 50 | 60 |

It will be apparent to those skilled in the art that various modifications and variations could be made in the process of the invention without departing from the scope or spirit of the invention.

What is claimed is:

1. A continuous process for the manufacture of homopolymers of ethylene or of copolymers of ethylene with at least one alpha-olefin containing from 3 to 8 carbon atoms, comprising in succession:
   (a) a first stage for (co)polymerizing ethylene at a temperature of between 180° and 320° C., at a pressure of between 300 and 2,500 bars, in the presence of a catalytic system comprising, on the one hand, at least one halogenated compound of a transition metal from groups IVA to VIA of the Periodic System and, on the other hand, at least one activator selected from the hydrides and the organometallic compounds of metals of groups I to III of the Periodic System, the molar ratio of the activator to the transition metal compound being between 1 and 10,
   (b) a second stage for separating the (co)polymer formed from unreacted monomer(s), at a pressure of between 100 and 500 bars,
   (c) a third stage for recycling the unreacted monomer(s), and
   (d) a fourth stage for recompression up to the (co)polymerization pressure,
   wherein said third stage comprises introducing into the stream of recycled monomer(s), during the third stage, at least one compound selected from the group consisting of amides of saturated or unsaturated organic acids containing from 12 to 22 carbon atoms and polyalkylene polyols selected from the group consisting of:
   (1) polyethylene glycol with a molecular weight between 200 and 10,000,
   (2) polypropylene glycol with a molecular weight between 250 and 4,000, and
   (3) a cotelomer comprising ethylene glycol units and polypropylene glycol units.

2. A process according to claim 1, wherein the quantity of said introduced compound is between 0.005 and 0.1 mole per ton of recycled monomer(s).

3. A process according to claim 1 wherein said introduced compound is selected from the group consisting of erucamide oleamide, and stearamide.

4. A process according to claim 1, wherein the polyalkylene polyol is polyethylene glycol with a molecular weight between 200 and 10,000.

5. A process according to claim 1, wherein the polyalkylene polyol is polypropylene glycol with a molecular weight between 250 and 4,000.

6. A process according to claim 1, wherein the polyalkylene polyol is a cotelomer comprising ethylene glycol units and polypropylene glycol units.

7. A process according to claim 2 wherein said introduced compound is selected from the group consisting of erucamide, oleamide, and stearamide.

8. A process according to claim 2, wherein the polyalkylene polyol is polyethylene glycol with a molecular weight between 200 and 10,000.

9. A process according to claim 2, wherein the polyalkylene polyol is polypropylene glycol with a molecular weight between 250 and 4,000.

10. A process according to claim 2, wherein the polyalkylene polyol is a cotelomer comprising ethylene glycol units and polypropylene glycol units.

11. A continuous process for the manufacture of homopolymers of ethylene or of copolymers of ethylene with at least one γ-olefin containing from 3 to 8 carbon atoms, comprising in succession:
   (a) a first stage for (co)polymerizing ethylene at a temperature of between 180° and 320° C., at a pressure of between 300 and 2,500 bars, in the presence of a catalytic system comprising, on the one hand, at least one halogenated compound of a transition metal from groups IVA to VIA of the Periodic System and, on the other hand, at least one activator selected from the hydrides and the organometallic compounds of metals of groups I to III of the Periodic System, the molar ratio of the activator to the transition metal compound being between 1 and 10,
   (b) a second stage for separating the (co)polymer formed from unreacted monomer(s), at a presence of between 100 and 500 bars,
   (c) a third stage for recycling the unreacted monomer(s), and
   (d) a fourth stage for recompression up to the (co)polymerization pressure,
   wherein said third stage comprises introducing into the stream of recycled monomer(s), during the third stage, at least one compound containing at least two epoxide functions, said compound having a molecular weight greater than approximately 200.

12. A process according to claim 11, wherein the compound containing at least two epoxide functions is epoxydized soya bean oil.

13. A process according to claim 11, wherein the quantity of said introduced compound is between 0.005 and 0.1 mole per ton of recycled monomer(s).

14. A process according to claim 13, wherein the compound containing at least two epoxide functions is epoxydized soya bean oil.

* * * * *